United States Patent
Downing et al.

(10) Patent No.: US 7,231,698 B2
(45) Date of Patent: *Jun. 19, 2007

(54) POST ATTACHMENT DEVICE

(75) Inventors: James R. Downing, Atlanta, GA (US); Samuel Vincent Tidwell, Sr., Dunwoody, GA (US); Steve L. Caldwell, Snellville, GA (US)

(73) Assignee: Hubbard/Downing, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/311,492

(22) Filed: Dec. 19, 2005

(65) Prior Publication Data

US 2006/0090311 A1    May 4, 2006

Related U.S. Application Data

(63) Continuation of application No. 10/627,066, filed on Jul. 25, 2003, now Pat. No. 6,978,523.

(51) Int. Cl.
   *A44B 11/25* (2006.01)
(52) U.S. Cl. .................. 24/628; 2/411; 2/425; 24/701
(58) Field of Classification Search ............. 24/701, 24/628, 666–668; 2/422, 416, 421, 425, 2/468, 411; 248/222.41, 221.12
   See application file for complete search history.

(56) References Cited

U.S. PATENT DOCUMENTS

| 988,558 | A | * | 4/1911 | England ................. 24/593.11 |
| 2,640,246 | A | * | 6/1953 | Shomber ..................... 24/628 |
| 3,583,042 | A | * | 6/1971 | Ishizaka .................. 24/265 R |
| 3,885,811 | A | * | 5/1975 | Takada ...................... 297/483 |
| 3,925,822 | A | * | 12/1975 | Sawyer ......................... 2/421 |
| 3,928,896 | A | * | 12/1975 | Puckett ........................ 24/667 |
| 6,381,758 | B1 | * | 5/2002 | Roberts et al. ................ 2/421 |
| 6,729,643 | B1 | * | 5/2004 | Bassick et al. .......... 280/730.1 |
| 6,813,782 | B2 | * | 11/2004 | Kintzi et al. .................... 2/421 |
| 6,978,523 | B2 | * | 12/2005 | Downing et al. ............. 24/628 |

OTHER PUBLICATIONS

HANS—Head and Neck Support Owner's Manual.

* cited by examiner

*Primary Examiner*—James R. Brittain
(74) *Attorney, Agent, or Firm*—Ian C. McLeod; Steven E. Merritt

(57) ABSTRACT

A post attachment device for connecting a helmet to a head and neck support. The device includes a post anchor having a base, a button, a resilient member, a post, a retainer and a catch having a slot with a larger first section connected by a channel to a smaller second section. The button is positioned in an indention in the base with the resilient member positioned therebetween. The post extends through the button, the base and the helmet. The retainer is secured on the post adjacent the inner surface of the helmet. To secure the post attachment device, the catch is orientated over the post. The button is then depressed into the base while the catch is moved backwards to move the post into the second section of the slot.

15 Claims, 7 Drawing Sheets

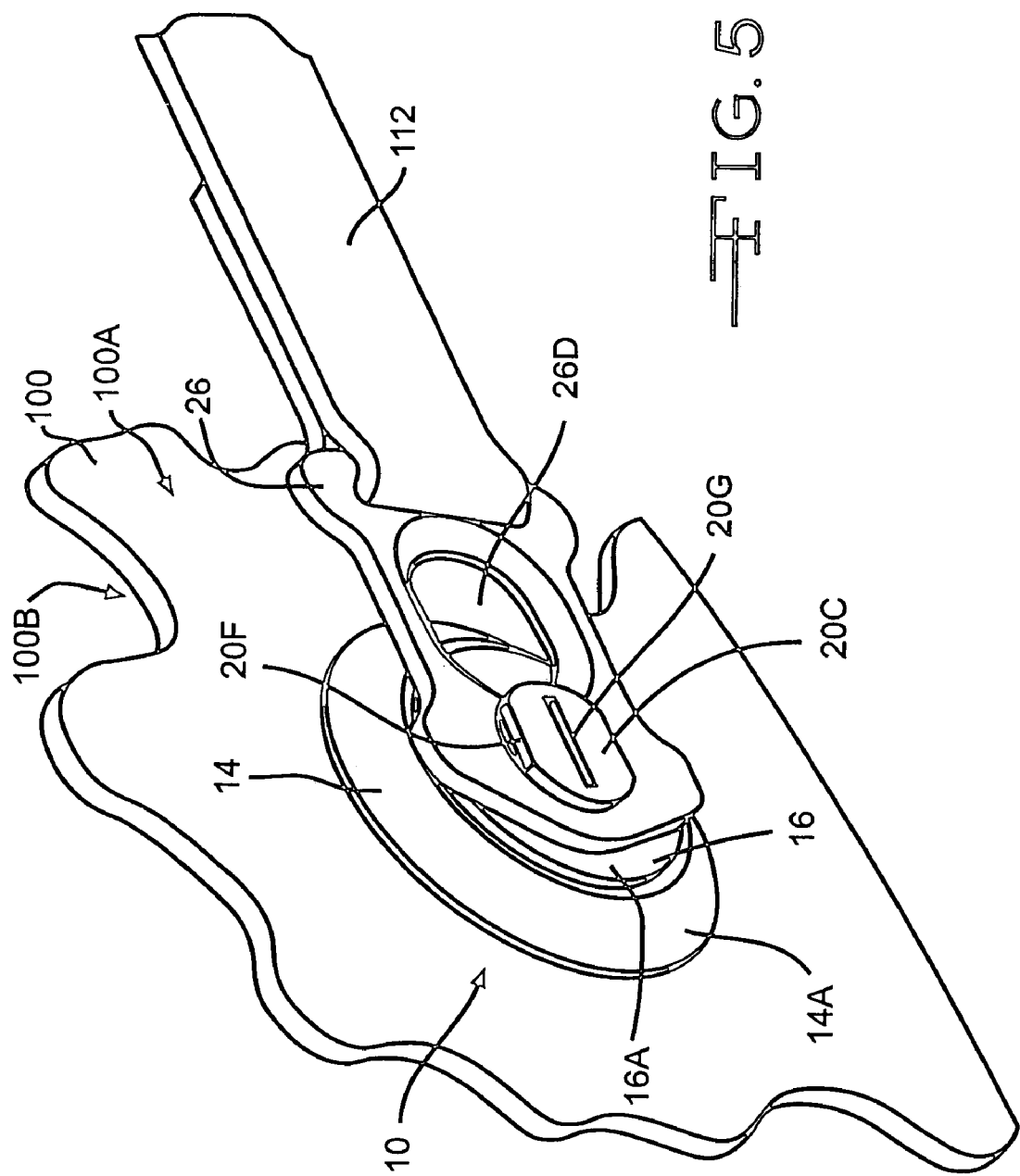

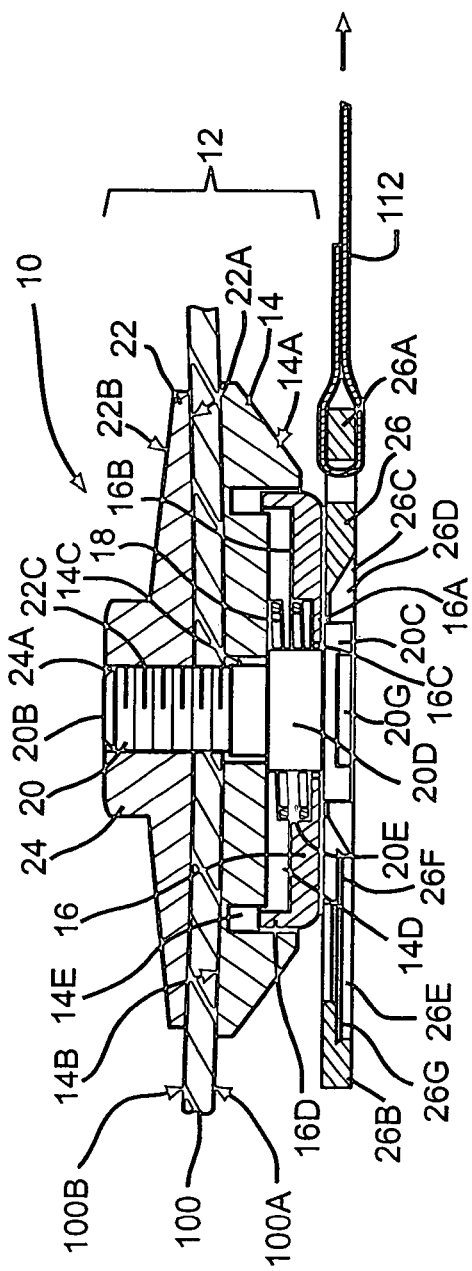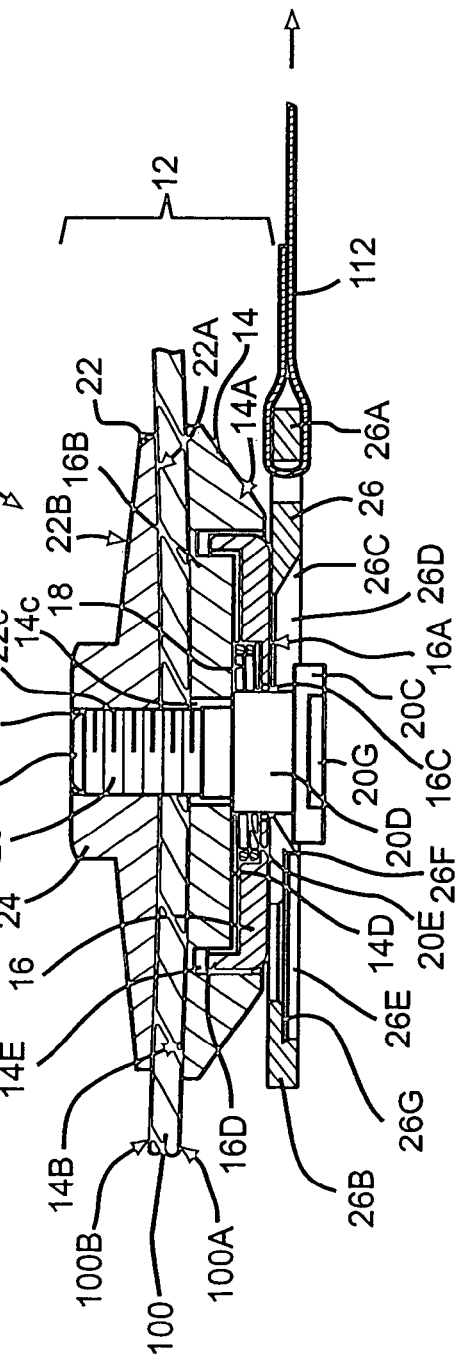

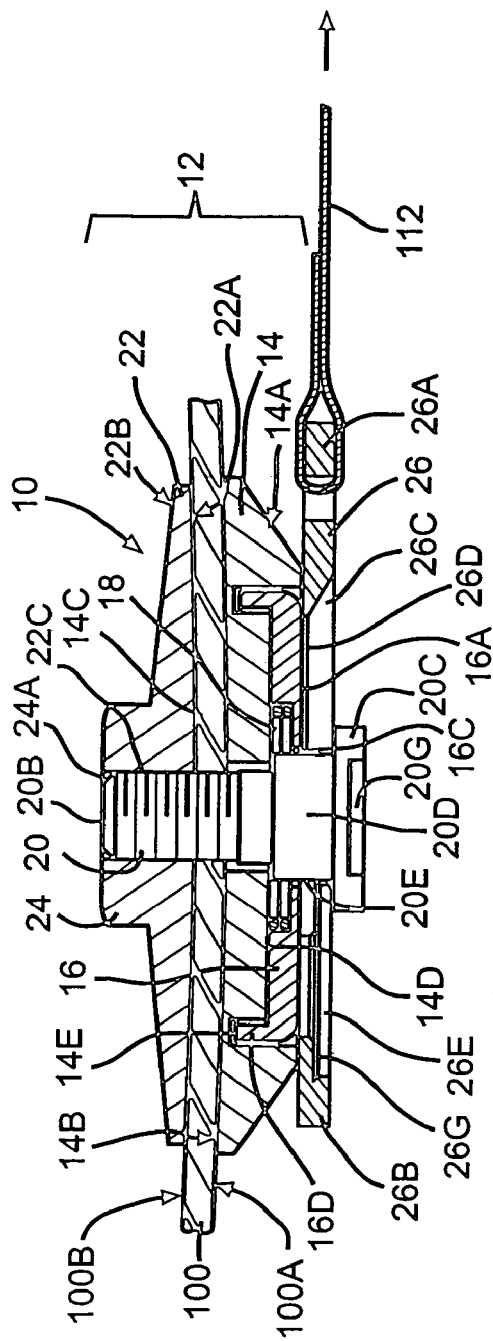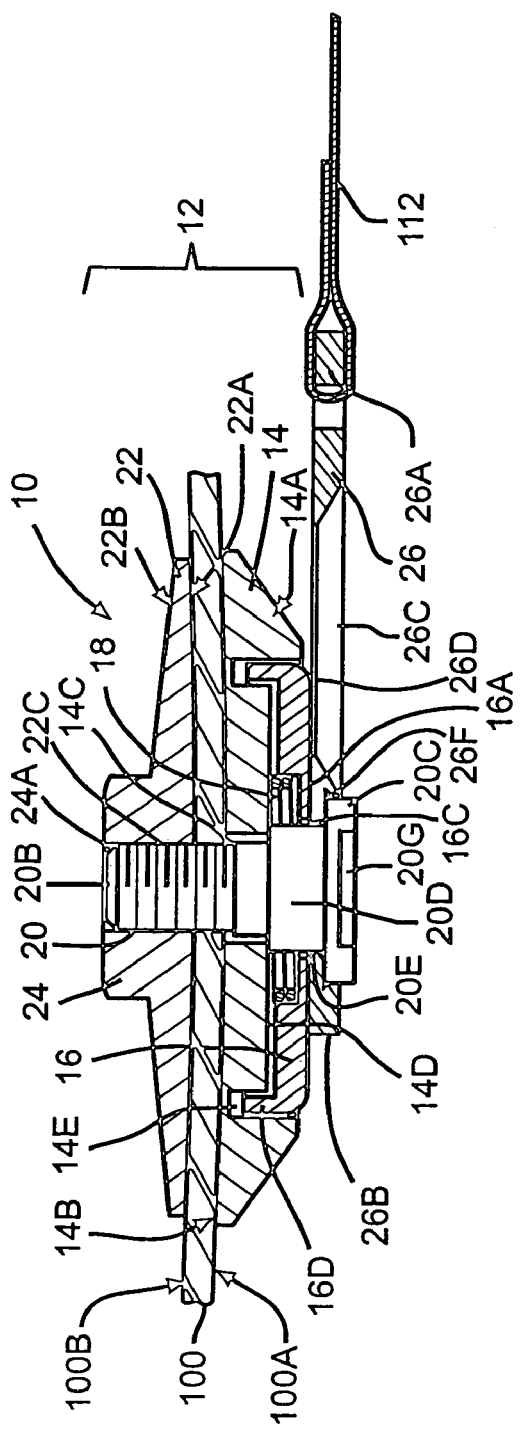

POST ATTACHMENT DEVICE

This application is a continuation of application Ser. No. 10/627,066 filed on Jul. 25, 2003 now U.S. Pat. No. 6,978,523.

CROSS-REFERENCE TO RELATED APPLICATION(S)

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a post attachment device for securing a tether between a helmet and a head and neck support device. In particular, the present invention relates to a post attachment device which uses post anchors mounted on the helmet and a catch connected to the head and neck support device to secure the helmet to the head and neck support device during use.

(2) Description of the Related Art

One (1) known system for connecting a helmet to a head and neck support device includes a J-clip mounted on the helmet and a D-ring connected by a tether to the head and neck support device. The J-clip on the helmet has a flat polished spring which deflects toward the helmet. To connect the D-ring to the J-clip, one (1) edge of the D-ring is pushed down onto the spring to deflect the spring and create an opening into the J-clip. While depressing the spring, the D-ring is moved towards the rear of the helmet. Once the D-ring is within the J-clip, the spring will snap back into the locked position securing the D-ring in the J-clip. To remove the D-ring from the J-clip, the D-ring is pulled toward the rear of the helmet while the spring is pressed down. While holding the spring down, the D-ring is slid forward and removed from the J-clip. One (1) disadvantage of the J-clip system is that it is difficult for the driver (user) to detach the J-clip without assistance. In addition, it is difficult for the user to attach the D-ring to the J-clip. It usually takes a user several attempts before succeeding in attaching the D-ring to the J-clip. In addition, the mounting of the J-clip to the helmet is complex and is usually done by the manufacturer.

There remains the need for an attachment device for connecting a helmet to a head and neck support device which can be connected and disconnected easily by the user, which is easy to mount on the helmet and which is robust and strong.

SUMMARY OF THE INVENTION

A post attachment device for connecting a helmet worn by a user to a head and neck support device worn by the user. The helmet is connected to the head and neck support device using a pair of post attachment devices extending between each side of the helmet and the sides of the head and neck support device adjacent each shoulder of the user. The post attachment devices include a post anchor mounted on the helmet and a catch connected to the head and neck support device by a tether. The post anchor includes a base, a button, a resilient member, a post and a retainer. The base is configured to be mounted on the outer surface of the helmet adjacent a hole in the helmet. The base has a center opening which is aligned with the hole in the helmet. The front surface of the base has an indention within which is positioned the button. The resilient member is positioned between the back side of the button and the floor of the indention. The resilient member acts to bias the button away from the floor of the indention and away from the helmet. The button has an opening which aligns with the center opening in the base and the hole in the helmet. The post is inserted through the opening of the button, through the opening in the base and through the hole in the helmet. The post has a head at one (1) end which is larger than the opening in the button so that the post can not extend through the button. The post has a connector section adjacent the head of the post. The connector section is smaller in size than the head and is able to fit through the opening of the button. However, the size of the connector section is greater than the center opening of the base so that the connector section is not able to extend through the center opening of the base. The connector section has a pair of opposed and parallel flat sections. The head of the post, in one (1) embodiment, has a pair of opposed and parallel flat sections which correspond and are parallel to the flat sections of the connector section. The head may also have a line which extends parallel to the flat sections of the connector section and can be used to identify the orientation of the connector section. The retainer is secured on the end of the post opposite the head and adjacent the inner surface of the helmet. When the anchor post is fully secured on the helmet, the connector section is in contact with the base adjacent the center opening of the base so that the base and helmet are sandwiched between the connector section of the post and the retainer secured to the second end of the post. The catch is connected at one (1) end to the head and neck support device and has a slot which extends between the ends. The slot has a larger first section connected by a channel to the smaller second section.

To connect the catch to the anchor post, the catch is positioned over the anchor post so that the head of the post is in the first section of the slot. The catch is then orientated so that the sides of the channel are parallel to the flat sections of the connector section. In one (1) embodiment, the post is orientated so that the flat sections of the connector section are essentially parallel to the ground surface or essentially horizontal. The user can use the flat sections of the head or the line on the head to determine the orientation of the flat sections of the connector section. The perimeter of the catch can be provided with flat sections which are parallel to the sides of the channel and can be used to determine the orientation of the sides of the channel. Once the catch is correctly orientated, the user pushes the catch inward toward the helmet while moving the catch backwards. As the user pushes inward on the catch, the catch pushes inward on the button which depresses or presses the button into the indention of the base. The button is depressed until the connector section of the post extends beyond the button and the space between the front side of the button and the back surface of the head of the post is greater than a thickness of the catch adjacent the channel. The user continues to press inward on the catch while continuing to move the catch toward the back of the helmet. As the catch is moved, the post moves from the first section of the slot through the channel to the second section of the slot. Due to the width of the channel and the shape of the connector section of the post, the post will only move through the channel when the flat sections of the connector section are parallel to the sides of the channel. Once the post is in the second section, the inward pressure on the catch is removed and the resilient member moves the button outward toward the back surface of the catch. When the post attachment device is fully attached, the catch around the perimeter of the second section of the slot is sandwiched and held between the front side of the button and the back surface of the head of the post. The catch can be provided with a recess around the perimeter of the second section which enables the head of the post to be securely seated on the catch adjacent the second section of the slot. The size and shape of the connector section of the post and the size and shape of the second section of the slot allows the catch to rotate on the post.

The present invention relates to an attachment device for connecting a head and neck support device to a helmet, which comprises: a base having a front surface and a back surface with an opening extending therebetween for positioning on the helmet with the back surface of the base adjacent an outer surface of the helmet and the opening of the base aligned with a hole in the helmet; a button having an opening and positioned adjacent the front surface of the base with the opening of the button aligned with the opening of the base; a resilient member positioned between the front surface of the base and the button for biasing the button in a direction away from the base; a post having opposed first and second ends with a head at the first end for positioning through the openings of the button and the base and the hole in the helmet so that the second end of the post is adjacent an inner surface of the helmet; a retainer for mounting on the second end of the post adjacent the inner surface of the helmet for securing the post in position in the hole in the helmet; and a catch for connecting to the head and neck support device and having an opening for connecting to the head of the post by positioning the head of the post through the opening.

Further, the present invention relates to a method for attaching a head and neck support device to a helmet, which comprises the steps of: providing a post attachment on the helmet which includes a base having a front surface and a back surface with an opening extending therebetween and positioned with the back surface adjacent an outer surface of the helmet with the opening aligned with a hole in the helmet; a button having an opening and positioned adjacent the front surface of the base with the opening of the button aligned with the opening of the base; a resilient member positioned between the front surface of the base and the button for biasing the button in a direction away from the base; a post having opposed first and second ends with a head at the first end and positioned through the openings of the button and the base and the hole in the helmet so that the second end of the post is adjacent an inner surface of the helmet and a retainer mounted on the second end of the post to secure the post in position in the hole of the helmet; providing a catch having an opening with a first section and a second section, the first section having a width greater than a width of the second section, wherein the catch is connected to the head and neck support device; positioning the catch so that the head of the post is adjacent the first section of the opening of the catch; depressing the button of the post attachment so that the button moves toward the helmet and the head of the post is spaced apart from the button; sliding the catch toward a back of the helmet until the post is in the second section of the catch; and releasing the button so that the resilient member moves the button toward the catch so that a portion of the catch around a perimeter of the second section of the opening of the catch is spaced between and in contact with the button and the head of the post.

Still further, the present invention relates to a method for mounting a post attachment to a helmet, which comprises the steps of: providing a post attachment including a base having a front surface and a back surface with an opening extending therebetween; a button having an opening and positioned adjacent the front surface of the base with the opening of the button aligned with the opening of the base; a resilient member positioned between the front surface of the base and the button for biasing the button in a direction away from the base; a post having opposed first and second ends with a head at the first end and a connector section adjacent the head, the connector section having a pair of opposed and parallel flat sections and a retainer for mounting on the second end of the post; drilling a hole in the helmet; positioning the base, button and resilient member adjacent an outer surface of the helmet so that the opening of the base and the opening of the button are aligned with the hole in the helmet; inserting the second end of the post through the opening in the button and through the opening of the base into and through the hole in the helmet; securing the retainer on the second end of the post adjacent an inner surface of the helmet to secure the post in position in the hole in the helmet; and rotating the post so that the flat sections of the connector section of the post are essentially parallel to a ground surface when the helmet is worn by a user.

The substance and advantages of the present invention will become increasingly apparent by reference to the following drawings and the description.

BRIEF DESCRIPTION OF THE DRAWINGS

FIG. 5 is a perspective view of the post attachment device 10 in the fully connected position.

FIG. 6 is a cross-sectional view of FIG. 4 along the line 6-6 showing the button 16 in the fully extended position.

FIG. 7 is a cross-sectional view of the post attachment device 10 showing the button 16 in the partially pressed position.

FIG. 8 is a cross-sectional view of the post attachment device 10 with the button 16 in the fully pressed position.

FIG. 9 is a cross-sectional view of the post attachment device 10 in the attached position.

DESCRIPTION OF PREFERRED EMBODIMENT(S)

Figure 1:
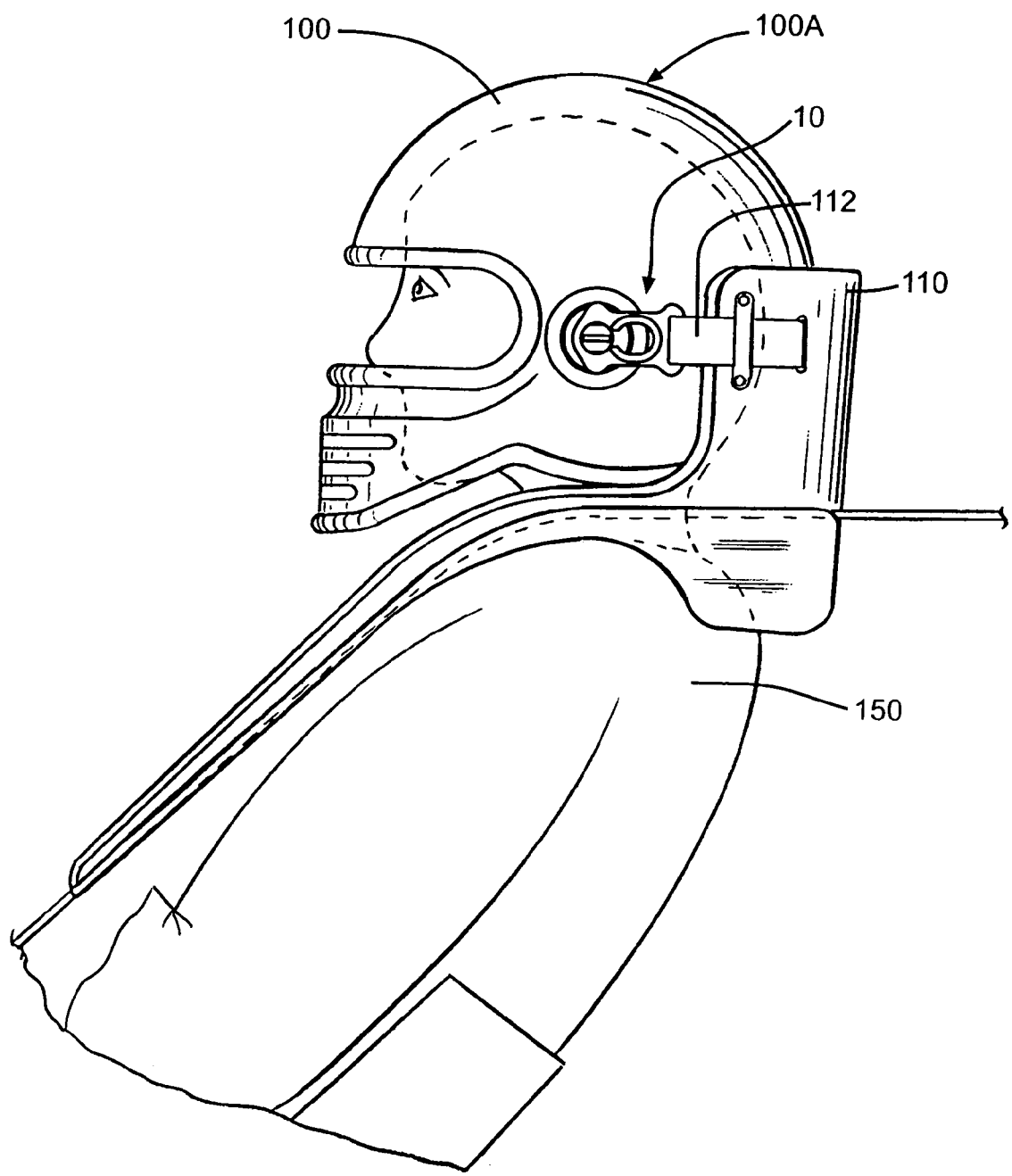
FIG. 1 is a side view showing the post attachment device 10 connecting a helmet 100 worn by a user 150 to a head and neck support device 110 worn by the user 150.

The post attachment device 10 of the present invention allows for a quick and secure method of connecting a helmet 100 worn by the user 150 to a head and neck support device 110 worn by the user 150 (FIG. 1). The attachment device 10 includes a post anchor 12 mounted on the helmet 100 and a catch 26 connected to the head and neck support device 110.

Figure 2:
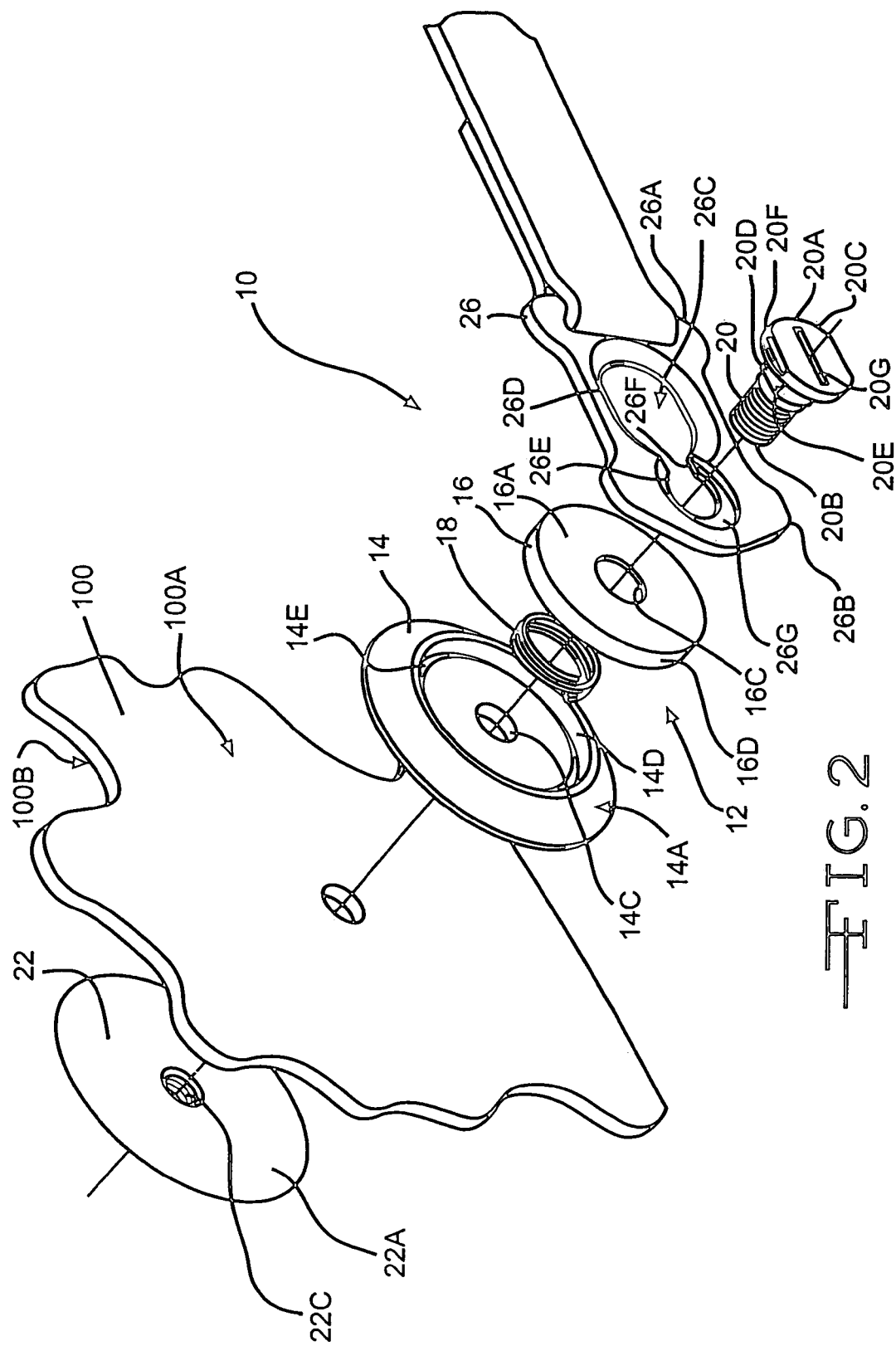
FIG. 2 is an exploded view of the post attachment device 10.
Figure 3:
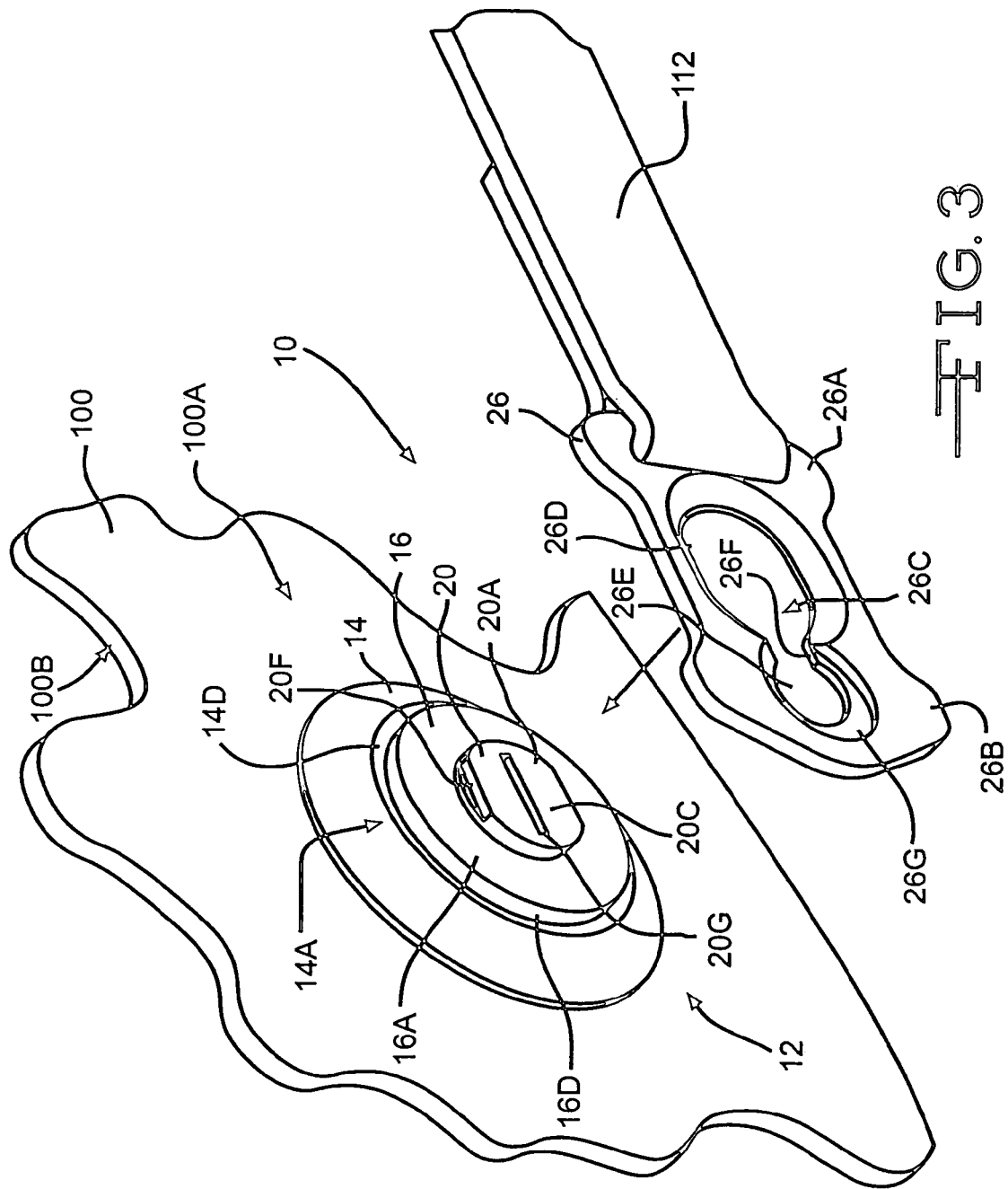
FIG. 3 is a perspective view of the post attachment device 10 in the disconnected position.

The post anchor 12 includes a base 14, a button 16, a resilient member 18, a post 20 and a retainer 22 (FIG. 2). The base 14 has a front surface 14A and a back surface 14B with a center opening 14C extending therebetween. In one (1) embodiment, the diameter of the center opening 14C of the base 14 is essentially equal to the diameter of the hole in the helmet 100. The back surface 14B of the base 14 is curved and smooth to match the curvature of the outer surface 100A of the helmet 100 so that the back surface 14B of the base 14 can be mounted flush against the outer surface 100A or skin of the helmet 100. In one (1) embodiment, the back surface 14B of the base 14 has a concave curvature. The front surface 14A of the base 14 has an indention 14D. In one (1) embodiment, the indention 14D is symmetrically positioned around the center opening 14C of the base 14. A groove 14E is provided around the perimeter of the indention 14D so that the indention 14D has a raised middle portion. The base 14, in one (1) embodiment, has a frustoconical shape.

The button 16 is mounted in the indention 14D of the base 14 and has a shape similar to the shape of the indention 14D. In one (1) embodiment, the indention 14D is circular and the button 16 has a circular cross-section. The button 16 has an opening 16C which is aligned with the center opening 14C of the base 14 when the button 16 is positioned in the indention 14D of the base 14. The center opening 14C of the base 14 is smaller in diameter than the center opening 16C of the button 16. The button 16 has a front side 16A and a back side 16B with a sidewall 16D around the perimeter extending outward from the back side 16B in a direction opposite the front side 16A. When the button 16 is positioned in the indention 14D, the sidewall 16D of the button 16 extends into the groove 14E around the perimeter of the indention 14D (FIGS. 6 to 9). In one (1) embodiment, the height of the sidewall 16D is equal to or less than the depth of the groove 14E of the indention 14D from the front surface 14A of the base 14 to the floor of the groove 14E and the thickness of the button 16 between the front and back sides is equal or less than the depth of the indention 14D so that the button 16 can be depressed until the front side 16A of the button 16 is flush with the front surface 14A of the base 14.

A resilient member 18 is mounted in the indention 14D of the base 14 and extends between the indention 14D and the back surface 14B of the button 16. When the button 16 is depressed, the resilient member 18 is compressed. The resilient member 18 acts to bias the button 16 out of the indention 14D and away from the base 14. In one (1) embodiment, the resilient member 18 is a coil spring and is positioned so that the center opening of the coil spring is aligned with the center opening 14C of the base 14 and the opening 16C of the button 16. It is understood that the resilient member 18 could be any well known means for biasing the button 16 away from the base 14 out of the indention 14D.

The post 20 has a first end 20A and a second end 20B with a head 20C at the first end 20A. The post 20 has a connector section 20D adjacent the head 20C. The connector section 20D of the post 20 has a pair of opposed and parallel flat sections or flats 20E. The smallest width of the connector section 20D is between the flat sections 20E. In one (1) embodiment, the connector section 20D has a generally cylindrical shape with curved sections spaced between the flat sections 20E. In this embodiment, the width of the connector section 20D between the flat sections is less than the width or diameter of the connector section 20D between the curved sections. In one (1) embodiment, the head 20C of the post 20 has a pair of opposed and parallel flat sections or flats 20F which are parallel to the pair of opposed and parallel flat sections 20E of the connector section 20D. In one (1) embodiment, the head 20C of the post 20 has a line 20G which extends between and parallel to the flat sections 20F of the head 20C and the flat sections 20E of the connector section 20D. In one (1) embodiment, the line 20G is a notch which acts as a screwdriver slot. The post 20 is of such a size and length as to extend through the openings 16C of the button 16 and the base 14 and through the hole in the helmet 100. In one (1) embodiment, the post 20 is a bolt having cylindrical shape with threads extending between the connector section 20D and the second end 20B. The diameter of the post 20 is less than the diameter of the hole in the helmet 100, the center opening 14C of the base 14 and the opening 16C of the button 16. The diameter or size of the head 20C of the post 20 is greater than the diameter or size of the opening 16C of the button 16 so that the post 20 can not extend completely through the button 16. The connector section 20D has a size or diameter greater than the size or diameter of the center opening 14C of the base 14 and less than the size or diameter of the opening 16C of the button 16 so that the connector section 20D extends through the button 16 and contacts the front surface 14A of the base 14 around the center opening 14C.

A retainer 22 is secured to the second end 20B of the post 20 which extends through the hole in the helmet 100 into the interior of the helmet 100. The retainer 22 has a front surface 22A and a back surface 22B with a center opening 22C extending therebetween. The front surface 22A of the retainer 22 is curved and smooth to match, the curvature of the inner surface 100B of the helmet 100 so that when the retainer 22 is tightly secured on the second end 20B of the post 20, the front surface 22A of the retainer 22 is flush against the inner surface 100B of the helmet 100. In one (1) embodiment where the post 20 is threaded, the opening 22C of the retainer 22 is threaded to engage the threads of the post 20. In this embodiment, an extension 24 is provided around the opening 22C in the retainer 22. The extension 24 has a center bore 24A which is aligned with the center opening 22C of the retainer 22. The center bore 24A of the extension 24 is threaded and provides additional contact with the threads of the post 20. In one (1) embodiment, the outer or perimeter size and shape of the back surface 14B of the base 14 is similar to the outer or perimeter size and shape of the front surface 22A of the retainer 22. In one (1) embodiment, the base 14 has a circular shaped back surface 14B and the retainer 22 has a circular shaped front surface 22A. In one (1) embodiment, both the base 14 and the retainer 22 have an outer diameter of 1.00 inch (25.4 mm).

The catch 26 has a first end 26A and a second end 26B with a slot or opening 26C extending therebetween. The catch 26 is connected at the first end 26A to the head and neck support device 110. In one (1) embodiment, the catch 26 is connected to the head and neck support device 110 by a tether 112. In one (1) embodiment, the head and neck support device 110 is assembled with tethers 112 having a length of approximately 6 inches (153 mm). In this embodiment, the tether length can be adjusted plus or minus ¾ inch (19 mm) for individual preference. The tether length should be long enough to allow motions of the head and helmet 100 that are actually needed, but no more. Different tether lengths may be desired for different uses. However, it is understood that any well known flexible means of connecting the catch 26 to the head and neck support device 110 can be used. The slot 26C of the catch 26 has a first section 26D adjacent the first end 26A and a second section 26E adjacent the second end 26B. The first and second sections 26D and 26E of the slot 26C are connected by a channel 26F. The width of the first section 26D of the slots 26C between the sides is greater than a diameter or width of the head 20C of the post 20. In one (1) embodiment, the first section 26D has an oval shape. However, it is understood that the first section 26D of the slot 26C of the catch 26 can have a variety of shapes provided the head 20C of the post 20 is able to be extended through the first section 26D of the slot 26C. In one (1) embodiment, the perimeter of the first section 26D of the slot 26C on the front surface of the catch 26 is beveled.

The second section 26E of the slot 26C has an essentially circular shape with a gap or opening into the channel 26F. The front surface of the catch 26 around the perimeter of the second section 26E is provided with a recess 26G. The outer, perimeter shape of the recess 26G of the second section 26E is greater than a width or diameter of the second section 26E of the slot 26C of the catch 26. The outer, perimeter shape of the recess 26G is essentially the same shape as the head 20C of the post 20 without the flat sections 20F. In one (1) embodiment, only an upper portion of the head 20C is provided with the flat sections 20F so that a bottom portion of the head 20C of the post 20 has a circular shape. In this embodiment, the shape and size of the recess 26G around the second section 26E of the slot 26C is essentially equal to the shape and size of the bottom portion of the head 20C. The channel 26F has an open ended, rectangular shape with a width between the sides less than a width of the first section 26D or the second section 26E of the slot 26C between the sides. The width of the channel 26F is slightly greater than a width of the connector section 20D of the post 20 between the flat sections 20E. In one (1) embodiment, the sides of the catch 26 have a straight, flat section which is parallel to the sides of the channel 26F.

In one (1) embodiment, the post 20 has an overall length of 0.68 inches (17.27 mm) and a diameter at the second end of approximately 0.25 inches (6.35 mm). The head 20C of the post 20 has a diameter of approximately between 0.4996 to 0.498 inches (12.6898 to 12.6492 mm), and the connector section 20D has a diameter of essentially between 0.307 and 0.312 inches (7.798 to 7.925 mm). The center opening 14C of the base 14 has a diameter of approximately 0.250 to 0.253 inches (6.35 to 6.426 mm). The first section 26D of the slot 26C of the catch 26 has a radius from the center point to the sides of approximately 0.251 to 0.260 inches (6.375 to 6.604 mm), the channel 26F has a width between the sides of approximately 0.255 to 0.265 inches (6.477 to 6.731 mm) and the second section 26E of the slot 26C has a radius of between about 0.160 to 0.168 inches (4.064 to 4.267 mm). The recess 26G around the second section 26E of the slot 26C of the catch 26 has a radius of approximately between 0.253 to 0.256 inches (6.426 to 6.502 mm). In one (1) embodiment, the components of the post attachment device 10 are constructed of stainless steel.

A pair of attachment devices 10 are used to connect the helmet 100 to the head and neck support device 110. The post attachment device 10 connects each side of the helmet 100 and the head 20C of the user 150 to the head and neck support device 110 adjacent each of the shoulders of the user 150. The post anchors 12 are mounted on opposite sides of the helmet 100 and are adjacent the ears (not shown) or sides of the head of the user 150 when the helmet 100 is worn by the user 150. The anchor posts 12 are mounted through holes drilled in the helmet 100. To position the holes correctly on the helmet 100, a vertical centerline must be drawn on the helmet 100 in the middle of the back of the helmet 100. The post anchors 12 must be installed symmetrically on each side of the vertical centerline. The vertical centerline is located by measuring the same distance from the left side and the right side of the helmet 100. To draw the centerline, a vertical strip of masking tape is positioned on the back of the helmet 100. The masking tape is applied to the outer surface 100A of the helmet 100 to protect the finish of the helmet 100 while marking for drilling. Next, strips of tape are placed on the left and right sides of the helmet 100 in the areas where the anchor posts 12 are going to be installed. A horizontal line is then drawn on the tape on the back of the helmet 100 approximately 1.5 inches (38 mm) up from the top of the molding at the bottom edge of the helmet 100. A vertical dash, point or short vertical line is drawn on the masking tape at the back of the helmet 100 at approximately the location of the vertical centerline. The distance from the left side pivot point of the visor or face shield of the helmet 100 to the vertical dash on the back of the helmet 100 is measured. This measurement is used to measure the same distance from the right side pivot point for the visor to the back of the helmet 100. A second vertical dash is drawn at this point. Finally, a vertical line is drawn on the tape halfway between the two (2) vertical dashes. This line is the true centerline.

Next, lines are drawn 1.5 inches (38 mm) from the top of the rubber edge molding at the lower edge of the helmet 100 on the tape on each side of the helmet 100 and at the vertical centerline which creates an intersection point on the true vertical centerline. Next, for standard helmets 100, a distance of 6.0 inches (151 mm) is measured from the intersection point on the true centerline around the helmet 100. A dash is made at this point so as to intersect the horizontal line 1.5 inches (38 mm) from the top of the rubber edge molding of the helmet 100. This will be the center hole of the first post anchor 12. The same distance is measured on the other side of the helmet 100 to locate the center hole for the second post anchor 12. For Simpson Sidewinder™ helmets, a distance of 4.75 inches (121 mm) is measured rather than 6.0 inches (151 mm). For Bell™ helmets, where ridges will not allow the base plate to sit flat on the helmet, a distance of 5.25 inches (133 mm) is measured. The tether 112 length must be adjusted according to the position of the anchor posts 12. Finally, the distance between the two (2) marks for the center of the holes is measured to confirm that the holes will be about 12 inches (305 mm) apart, measured on the surface of the helmet 100 and 1.5 inches (38 mm) from the top edge of the molding. In more precise technical terms, the center marks should be on the S4 plane as described in the Snell Standard for Protective Headgear, 90 mm behind the coronal (transverse) plane and separated by approximately 180 to 220 mm (7.1 to 8.7 inches).

Once the center point for the holes is located, the holes are drilled in the left and right sides of the helmet 100. In one (1) embodiment, the holes have a 0.25 inch (6 mm) diameter. The holes are drilled through the helmet shell but not through the padding. Finally, the tape is removed and the holes are deburred.

To assemble the anchor posts 12 on the helmet 100, the post 20 is inserted through the button 16, the resilient member 18, the base 14 and the hole in the helmet 100. Next, the post 20 is secured to the retainer 22 on the inside of the helmet 100. The retainer 22 must be flush against the inner surface 100B of the helmet 100. The post 20 is tightened until snug or when all the clearance is gone but there is no additional torque or tightening. When the anchor post 12 is fully secured on the helmet 100, the connector section 20D of the post 20 is in contact with the front surface 14A of the base 14 around the perimeter of the center hole of the base 14. After the post 20 is snug, the post 20 is tightened or torqued by turning clockwise an additional 0.125 inch (3.2 mm) turn (about 40 to 45 degrees). The flats 20F of the post 20, the line 20G, and the flat sections 20E of the connector section 20D should be parallel to the ground or essentially horizontal after final tightening.

Once the post anchors 12 are secured to the helmet 100, the helmet 100 can then be connected to the head and neck support device 110. The helmet 100 is secured to the head and neck support device 110 after the helmet 100 and the head and neck support device 110 are secured on the user 150. To attach a tether 112 to the helmet 100, the tether 112 is connected at one end of the head and neck support device 110 and at the other end to the catch 26.

Figure 4:
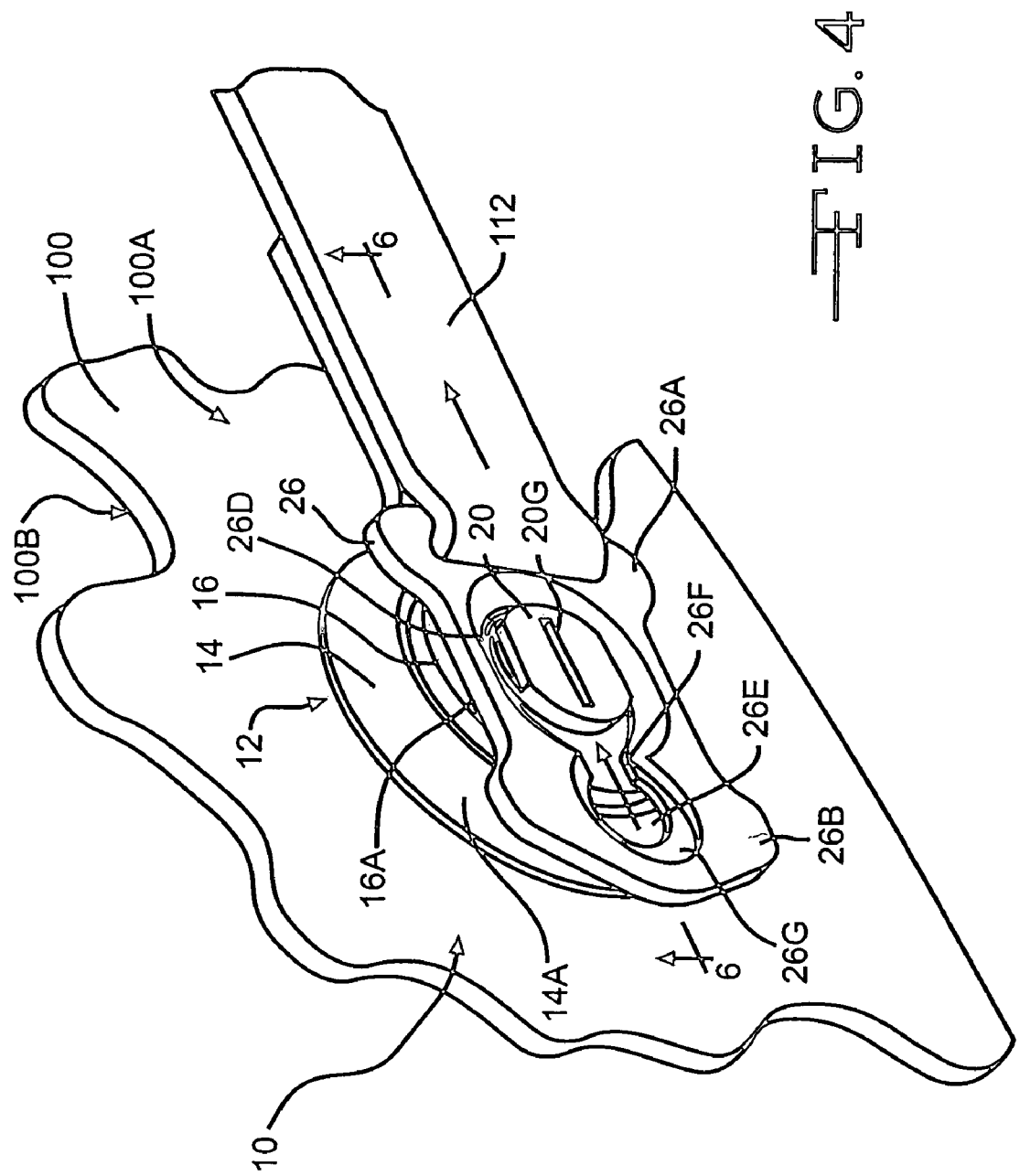
FIG. 4 is a perspective view of the post attachment device 10 prior to attachment.

To secure the catch 26 to the post anchor 12, the catch 26 is placed so that the first section 26D of the slot 26C of the catch 26 is over the head 20C of the post 20 of the first post anchor 12 (FIGS. 4 and 6). The catch 26 is then aligned so that the sides of the channel 226F are aligned with the flats 20E of the connector section 20D. The user 150 can align the catch 26 by aligning the sides of the channel 26F with the flats 20F of the head 20C of the post 20 or by aligning the line 20G of the head 20C so that the line 20G is parallel to and spaced between the sides of the channel 26F. In one (1) embodiment, the outer perimeter of the catch 26 has flat sections which are parallel to the sides of the channel 26F of the slot 26C. The flat sections of the catch 26 can be used by the user 150 to align the sides of the channel 26F with flat sections 20E of the connector section 20D. When the catch 26 is correctly positioned, the sides of the channel 26F are essentially horizontal or parallel to ground surface. The orientation of the flat sections of the connector section 20D minimizes the chance of the catch 26 being inadvertently removed from the anchor post 12 during a violent rebound of the user 150 and his head during an accident. Next, the catch 26 is pushed inward toward the helmet 100 and is simultaneously moved or slid backwards toward the rear of the helmet 100. The back surface of the catch 26 is flat and smooth to allow for easily sliding the catch 26 along the smooth front side 16A of the button 16. As the catch 26 is pushed inward, the back surface of the catch 26 contacts the front side 16A of the button 16 and depresses the button 16 so that the button 16 moves toward the helmet 100 (FIG. 7). As the button 16 is depressed, the resilient member 18 is compressed. The button 16 is depressed until the connector section 20D of the post 20 extends beyond the opening 16C of the button 16 and the distance between the front side 16A of the button 16 and the back surface of the head 20C of the post 20 is greater than a thickness of the catch 26 (FIG. 8). In this position, in one (1) embodiment, the front side 16A of the button 16 is flush with the front surface 14A of the base 14. When the button 16 is in the pressed condition, the catch 26 is moved backwards so that the connector section 20D of the post 20 moves along the channel 26F and the post 20 is moved from the larger first section 26D of the slot 26C to the smaller second section 26E of the slot 26C. When the post 20 is fully within the second section 26E of the slot 26C of the catch 26, the pressure on the catch 26 is released so that the resilient member 18 expands and moves the button 16 toward the catch 26. In the fully attached position, the head 20C of the post 20 is in the recess 26G around the second section 26E of the slot 26C (FIGS. 5 and 9). In this position, the catch 26 around the second section 26E of the slot 26C is sandwiched and held in position between the back surface of the head 20C of the post 20 and front side 16A of the button 16. To ensure that the post 20 is fully within the second section 26E of the slot 26C and the catch 26 is fully secured to the post anchor 12, the tethers 112 can be pulled toward the back of the helmet 100. The shape and size of the connector section 20D of the post 20 and the shape and size of the second section 26E of the slot 26C of the catch 26 enable the catch 26 to easily and smoothly rotate on the post 20. In one (1) embodiment, when the catch 26 is correctly secured to the anchor post 12, the catch 26 and tether 112 are able to rotate at least 160° about the post 20. In one (1) embodiment, the second section 26E has a generally circular shape with an opening to the channel 26F and the connector section 20D has an essentially circular or cylindrical shape with parallel and opposed flat sections 20E.

To remove the catch 26 from the post anchor 12, the catch 26 is aligned so that the flats 20E of the connector section 20D are aligned with the sides of the channel 26F of the slot 26C of the catch 26. The catch 26 is then pressed inward toward the helmet 100 to depress the button 16. While depressing the button 16, the catch 26 is slid forward so that the connector section 20D moves along the channel 26F from the second section 26E to the first section 26D.

The dimensions and tolerances of the base 14, button 16 and post 20 are not dependent on the helmet 100 or its dimensions. When correctly secured on the helmet 100, the tightening of the post 20 clamps and secures the anchor post 12 on the helmet 100 between the base 14 and the retainer 22. Due to the size or outer dimensions of the base 14 and retainer 22, the base 14 and retainer 22 act to disperse any loads such as tension, shear or torque applied by the tether 112 to the helmet 100 to a larger area of the helmet 100 rather than merely around the smaller hole in the helmet 100. The use of the larger contact area creates a more robust and stronger attachment.

It is intended that the foregoing description be only illustrative of the present invention and that the present invention be limited only by the hereinafter appended claims.

We claim:

1. An attachment device adapted for connecting a head and neck support device to a helmet, which comprises:
   (a) a base having a front surface and a back surface with an indention in the front surface and having an opening extending between the front and back surfaces;
   (b) a button having an opening and positioned in the indention in the front surface of the base with the opening of the button aligned with the opening of the base wherein when the button is pressed, the button moves into the indention in the base;
   (c) a resilient member positioned between the base and the button for biasing the button away from the base;
   (d) a post having opposed first and second ends with a head at the first end for positioning through the openings of the button and the base adjacent to the head and connected to a retainer toward the second end wherein the post has a connector section adjacent to the head and the connector section has a size less than a size of the head wherein the connector section has a pair of opposed parallel flat sections and wherein the head has an indicator line spaced between and parallel to the flat sections of the connector section; and
   (e) a catch having an opening for connecting to the head of the post by positioning the head of the post through the opening.

2. The device of claim 1 wherein the button has a front surface and a back surface and is positioned in the indention when the button is pressed, the front surface of the button is flush with the front surface of the base adjacent the indention.

3. The device of claim 1 wherein the head has a pair of opposed and parallel flat sections adjacent and parallel to the pair of flat sections of the connector section.

4. The device of claim 1 wherein a width of the connector section between the flat sections is less than a width of the opening of the catch.

5. The device of claim 1 wherein the opening of the catch has a first section and a second section, wherein a width of the first section is greater than a width of the second section and greater than a width of the head of the post and wherein the width of the second section is less than the width of the head of the post.

6. The device of claim 5 wherein the post has a connector section adjacent the head, wherein a width of the connector section is less than the width of the head of the post and wherein the width of the connector section is less than the width of the second section of the opening of the catch so that the connector section is able to slide into the second section of the opening of the catch.

7. The device of claim 6 wherein the connector section has a cylindrical shape so that when the connector section is in the second section of the opening of the catch, the catch can rotate around the connector section of the post.

8. The device of claim 5 wherein a channel having parallel sides connects the first section of the opening of the catch to the second section of the opening of the catch, the channel having a width between the sides less than a width of the first section and less than a width of the second section, wherein the post has a connector section adjacent the head, the connector section having a pair of opposed and parallel flat sections, and wherein the width of the channel is greater than a width of the connector section between the flat sections so that the connector section can be moved between the first and second sections of the opening through the channel.

9. The device of claim 8 wherein the connector section has an essentially cylindrical shape with curved sections spaced between the flat sections, wherein a diameter of the connector sections between the curved sections is greater than the width of the connector section between the flat sections and the width of the channel between the sides so that the flat sections of the connector section must be parallel to and spaced between the sides of the channel when the post is moved from the first section to the second section of the opening through the channel.

10. The device of claim 5 wherein the catch has a recess extending around a portion of a perimeter of the second section of the opening, wherein a size of the recess is greater than a size of the head of the post to allow the head to extend into the recess when the post is in the second section of the opening and the catch is connected to the post.

11. The device of claim 1 wherein the catch is adapted to be connected to the head and neck support device by a strap.

12. The device of claim 1 wherein a size of the back surface of the base is adapted to be greater than a size of a hole in the helmet.

13. The device of claim 12 wherein a retainer is mounted on the second end of the post adjacent the inner surface of the helmet and wherein a size of the retainer adjacent the inner surface of the helmet is essentially similar to the size of the back surface of the base.

14. An attachment device for connecting a head and neck support device to a helmet, which comprises:

(a) a base having a front surface and a back surface with an indention in the front surface and having an opening extending between the front and back surfaces, the base configured to be mounted with the back surface on and in contact with an outer surface of the helmet and the opening of the base aligned with a hole in the helmet;

(b) a button having a front surface and a back surface and an opening and positioned in the indention in the front surface of the base with the opening of the button aligned with the opening of the base wherein when the button is pressed, the button moves into the indention in the base toward the outer surface of the helmet and the front surface of the button is flush with the front surface of the base adjacent the indention;

(c) a resilient member positioned between the base and the button for biasing the button away from the base;

(d) a post having opposed first and second ends with a head at the first end for positioning through the openings of the button and the base and the hole in the helmet so that the second end of the post is adjacent the inner surface of the helmet; and (e) a catch for connecting to the head and neck support device and having an opening for connecting to the head of the post by positioning the head of the post through the opening.

15. An attachment device for connecting a head and neck support device to a helmet, which comprises:

(a) a base having a front surface and a back surface with an indention in the front surface and having an opening extending between the front and back surfaces, the base configured to be mounted with the back surface on and in contact with an outer surface of the helmet and the opening of the base aligned with a hole in the helmet;

(b) a button having an opening and positioned in the indention in the front surface of the base with the opening of the button aligned with the opening of the base wherein when the button is pressed, the button moves into the indention in the base toward the outer surface of the helmet;

(c) a resilient member positioned between the base and the button for biasing the button in a direction away from the outer surface of the helmet;

(d) a post having opposed first and second ends with a head at the first end for positioning through the openings of the button and the base and the hole in the helmet so that the second end of the post is adjacent the inner surface of the helmet wherein the post has a connector section having a pair of opposed and parallel flat sections adjacent the head, wherein the connector section has a size less than the size of the head and wherein the head has a pair of opposed and parallel flat sections adjacent and parallel to the pair of flat sections of the connector section; and (e) a catch for connecting to the head and neck support device and having an opening for connecting to the head of the post by positioning the head of the post through the opening.

* * * * *